United States Patent
Hemena et al.

[19]

[11] Patent Number: 6,160,724
[45] Date of Patent: Dec. 12, 2000

[54] BOOST DOUBLER CIRCUIT WHEREIN AN AC BRIDGE RECTIFIER IS NOT REQUIRED

[75] Inventors: William Hemena, Raleigh; Randhir Malik, Cary, both of N.C.

[73] Assignee: International Business Machines Corporation, Armonk, N.Y.

[21] Appl. No.: 09/426,735

[22] Filed: Oct. 26, 1999

[51] Int. Cl.$^7$ ............................................... H02M 3/18
[52] U.S. Cl. ............................................... 363/61
[58] Field of Search .................. 363/59, 60, 61, 363/84, 89, 125, 127

[56] References Cited

U.S. PATENT DOCUMENTS

| | | | |
|---|---|---|---|
| 4,855,666 | 8/1989 | Jones | 323/351 |
| 5,973,939 | 10/1999 | Tan | 263/21 |

*Primary Examiner*—Matthew Nguyen
*Attorney, Agent, or Firm*—Sawyer Law Group

[57] ABSTRACT

A boost doubler circuit is disclosed. The circuit comprises an input, a voltage on the input to an output voltage, a transistor arrangement coupled to the input, and a drive circuit coupled to the transistor arrangement for driving. The circuit further comprises an output coupled to the drive circuit, for receiving the output voltage, wherein an AC bridge rectifier is not required. Through the use of the boost doubler circuit in accordance with the present invention, the full wave rectifier bridge circuit of conventional boost circuitry is not required. Furthermore, since the full wave rectifier bridge has been eliminated from the circuit design, the EMC problems related to the rectifier bridge circuit are not prevalent in the present invention and also the additional power dissipation in the rectifier bridge is eliminated. This results in a more energy efficient boost circuit configuration.

11 Claims, 3 Drawing Sheets

Boost Circuit, S1 is closed for high line condition

Boost Circuit, Prior Art

Boost Doubler Circuit, S1 is closed

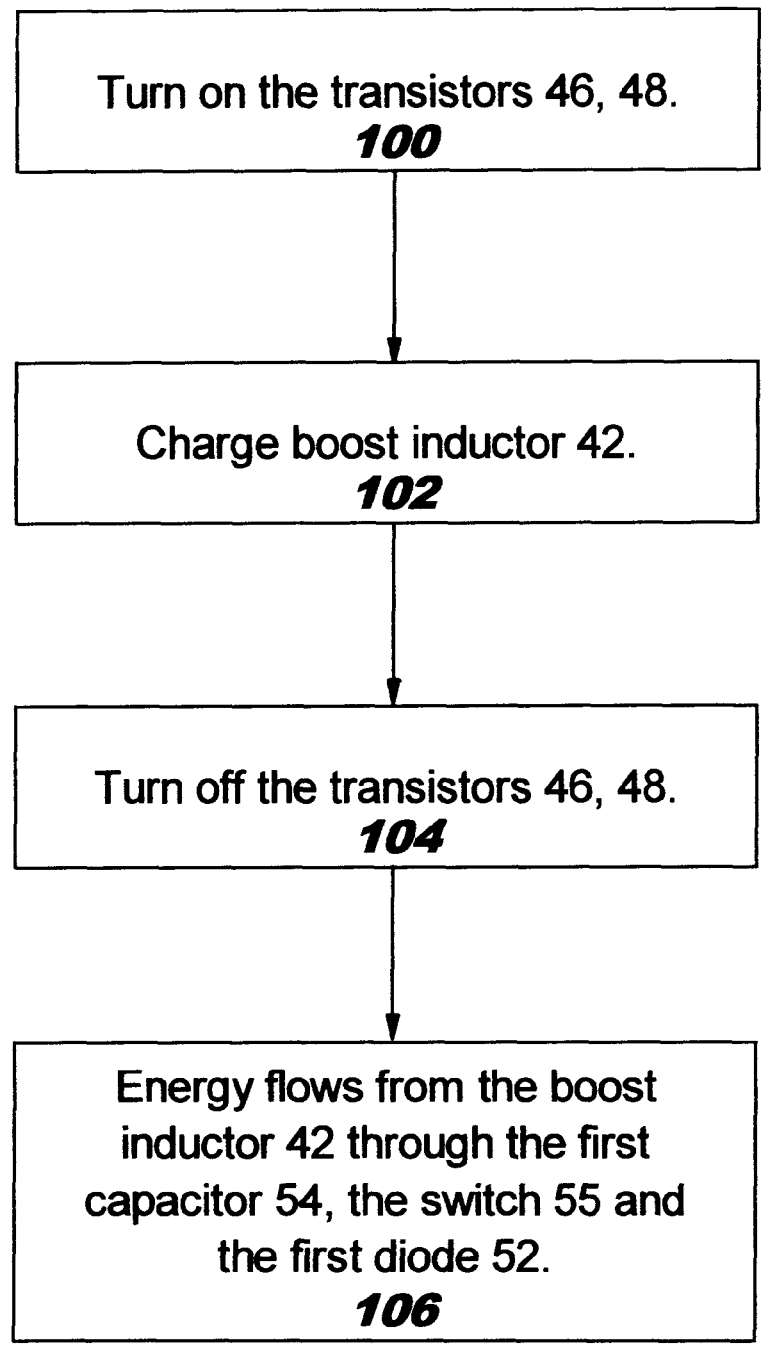

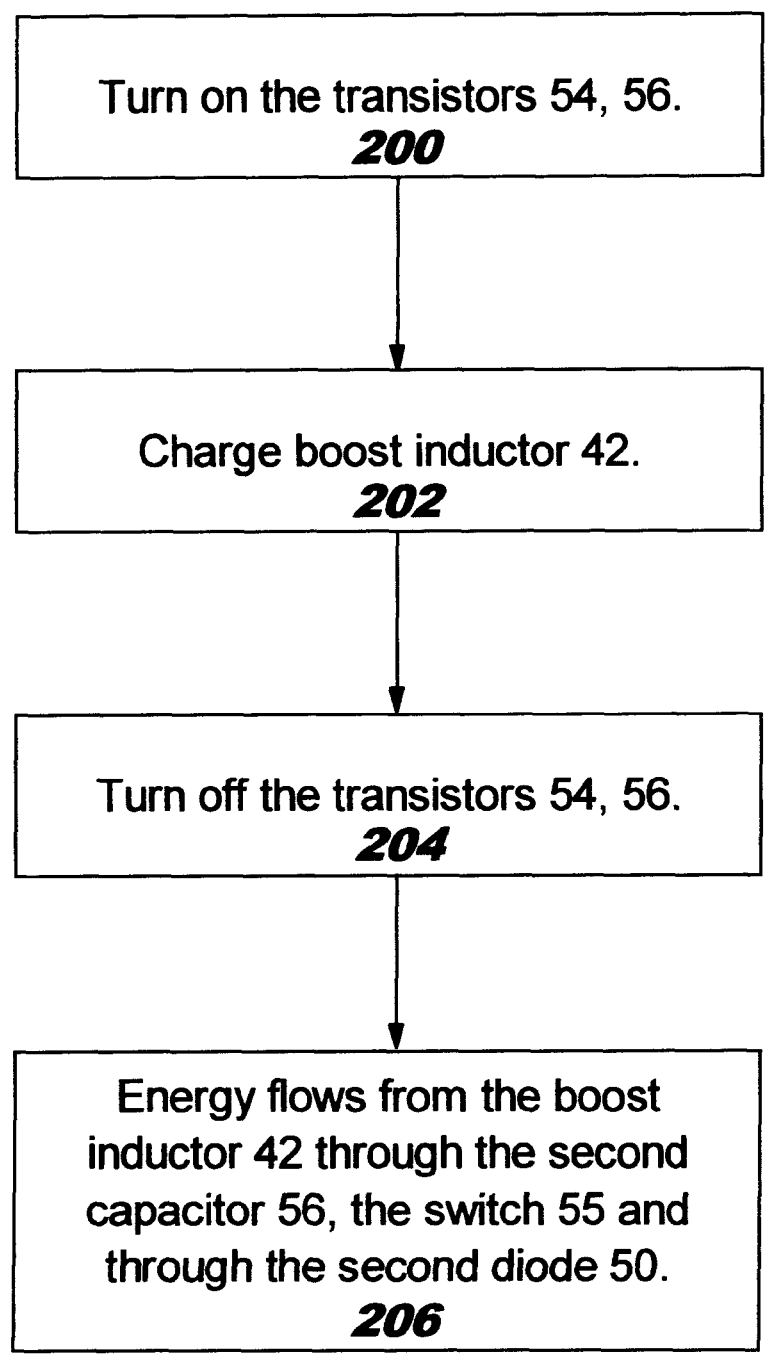

BOOST DOUBLER CIRCUIT WHEREIN AN AC BRIDGE RECTIFIER IS NOT REQUIRED

FIELD OF THE INVENTION

The present invention relates generally to processing systems and specifically to a boost doubler circuit for a processing system.

BACKGROUND OF THE INVENTION

Boost circuits are commonly used in desktop computers where a high power factor is required. A boost circuit is used when the AC line current is required to be in phase with the AC line voltage. FIG. 1 depicts a conventional boost circuit 10. The boost circuit 10 includes a boost inductor 14, a MOSFET transistor 16, a capacitor 20, and diodes 18 and 12. Diode 12 comprises a rectifier bridge circuit. However, this type of conventional boost circuit is not very efficient when used to operate over a wide range of input AC line voltages.

For instance, at a low line input voltage, there is always a two diode voltage drop in the rectifier bridge circuit. Moreover, the bridge circuit is inserted between filter components and the boost circuit and a large heat sink is required for the bridge. This arrangement causes a lot of Electro-Magnetic Compatibility (EMC) problems. Also, the switching losses in the transistor 16 are very high due to the high switching voltage of the bulk voltage (i.e. $+V_b=400V$) and the large AC line current. Moreover, the steady state loss in the transistor 16 is extremely high due to the high voltage rating MOSFET required. Furthermore, these losses are responsible for thermal problems in circuits where the application requires high power (e.g. 1000W or more).

Accordingly, what is needed is an improved boost circuit that performs more efficiently than conventional boost circuits. The present invention addresses such a need.

SUMMARY OF THE INVENTION

A boost doubler circuit in accordance with the present invention is disclosed. The boost circuit comprises an input terminal, a voltage on the input terminal to an output voltage, a transistor arrangement coupled to the input terminal, and a drive circuit coupled to the transistor arrangement for driving. The circuit further comprises an output coupled to the drive circuit, for receiving the output voltage, wherein an AC bridge rectifier is not required.

Through the use of the boost doubler circuit in accordance with the present invention, the full wave rectifier bridge circuit of conventional boost circuitry is not required. Furthermore, since the full wave rectifier bridge has been eliminated from the circuit design, the EMC problems related to the rectifier bridge circuit are not prevalent in the present invention and also the additional power dissipation in the rectifier bridge is eliminated. This results in a more energy efficient boost circuit configuration.

BRIEF DESCRIPTION OF THE DRAWINGS

FIG. 3 is a flow diagram of the operation of the positive-half cycle of the boost doubler circuit in accordance with the present invention.

FIG. 4 is a flow diagram of the operation of the negative-half cycle of the boost doubler circuit in accordance with the present invention.

DETAILED DESCRIPTION

The present invention relates to an improved boost circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a first preferred embodiment and a second preferred embodiment. The present invention provides for an improved boost circuit. In accordance with the present invention, the boost circuit eliminates the need for the full wave rectifier bridge present in conventional boost circuitry. Furthermore, since the rectifier bridge been eliminated from the circuit design, the ElectroMagnetic Compatibility problems related to the rectifier bridge circuit and power dissipation are not prevalent in the present invention. Accordingly, the boost circuit in accordance with the present invention, is more energy efficient than conventional boost circuits.

Figure 2:
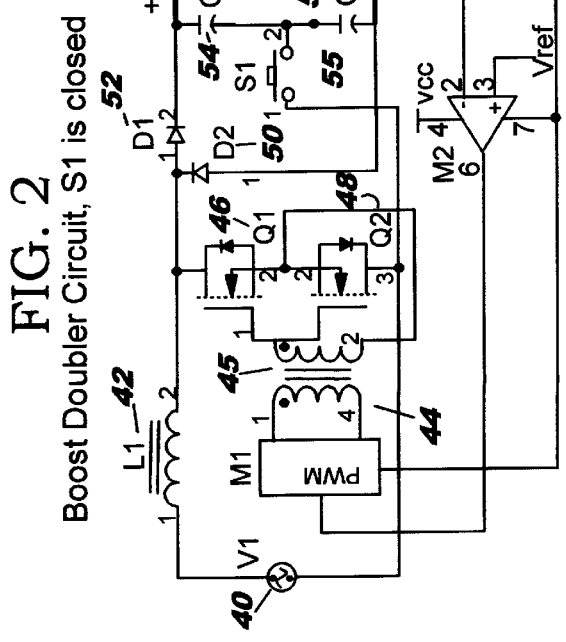
FIG. 2 shows a diagram of the boost doubler circuit in accordance with the first preferred embodiment of the present invention.

FIG. 2 illustrates a diagram of the boost doubler circuit in accordance with the first preferred embodiment of the present invention. The circuit includes an input 40, a boost inductor 42, a first MOSFET transistors 46 and a second MOSFET transistor 48, a first capacitor 54 and a second capacitor 56, a drive circuit 44 comprising at least one transformer 45, a first diode 52 and a second diode 50, a switch 55, and an output 58. Unlike the conventional boost circuit however, an AC rectifier bridge and its requisite components are not required.

When the AC line voltage V is applied, it undergoes a positive-half cycle and a negative-half cycle. FIG. 3 is a flow diagram of the operation of the circuit in accordance with the present invention during the positive-half cycle. Referring now to FIG. 2 and FIG. 3 together, first, the transistors 46, 48 are turned on, via step 100. Next, energy is stored in the boost inductor 42, via step 102. The boost inductor 42 charges through the first transistor 46 and the parallel combination of the second transistor 48 and its body diode. Next, the transistors 46, 48 are turned off, via step 104. Finally, the energy stored in the boost inductor 42 flows through the first diode 52, first capacitor 54 and switch 55, via step 106.

In this configuration, when the capacitor is charging, only one diode drop occurs as opposed to the three diode drop that occurs in the conventional boost circuit. Also, the capacitor voltage is kept constant by the pulse width modulator 44 that drives the transistors 46, 48.

For a better understanding of the operation of the negative-half cycle of the present invention, FIG. 4 is a flow diagram of the operation of the circuit in accordance with the present invention during the negative-half cycle. Referring now to FIG. 2 and FIG. 4, first the transistors 54, 56 are turned on, via step 200. Next, energy is stored in the boost inductor 42, via step 202. In the negative-half cycle, the boost inductor 42 charges through the second transistor 56 and the parallel combination of the first transistor 54 and its body diode. Next, the transistors 54, 56 are turned off, via step 204. Finally, the energy stored in the boost inductor 42 flows through the second diode 50, switch 55 and the second capacitor 56, via step 206. Again, unlike the conventional circuit, only one diode drop occurs during the inductor discharge as opposed to a three diode drop.

Figure 5:
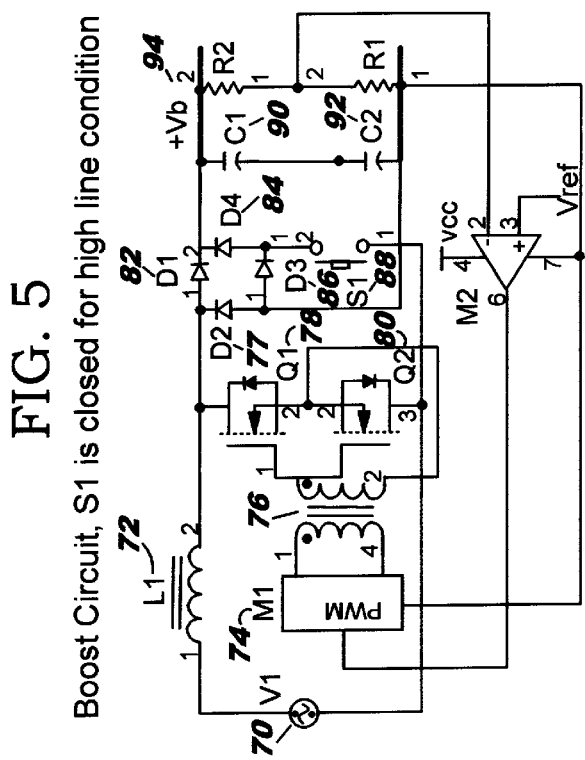
FIG. 5 shows a diagram of the boost circuit in accordance with the second preferred embodiment of the present invention.
Figure 1:
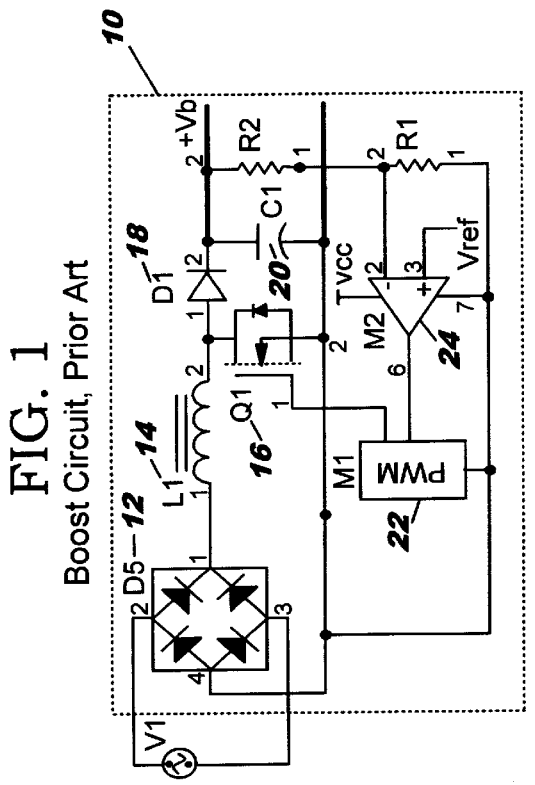
FIG. 1 is a diagram of a conventional boost circuit.

For an illustration of the second preferred embodiment of the present invention, please refer to FIG. 5. The circuit includes an input 70, a boost inductor 72, a first MOSFET transistors 78 and a second MOSFET transistor 80, a first capacitor 90 and a second capacitor 92, a transformer 76, four diodes 77, 82, 84, 86, a switch 88, and an output 94. Again, unlike the conventional boost circuit however, a full wave AC rectifier bridge and its requisite components are not required. Furthermore, this embodiment is suitable for a 220V AC application.

In this arrangement, diodes 86 and 84 have been added and the contact of switch 88 switches positions such that capacitors 90 and 92 are in series. Furthermore, the discharge of the inductor 72 occurs through diodes 82 and 86 during the positive-half cycle and through diodes 77 and 84 during the negative-half cycle. Although diodes 77, 82, 84, and 86 appear to illustrate a double diode drop, the net efficiency will still be better than the conventional circuitry because the energy flow through the diodes occurs for a shorter duration compared to conventional boost circuit.

Through the use of the boost circuit in accordance with the present invention, the fill wave rectifier bridge circuit of conventional boost circuitry is not required. Furthermore, since the full wave rectifier bridge has been eliminated from the circuit design, the EMC problems and bridge rectifier losses related to the rectifier bridge circuit are not prevalent in the present invention. This results in a more energy efficient boost circuit configuration.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A boost doubler circuit comprising an input terminal;

a voltage on the input terminal to an output voltage;

a transistor arrangement coupled to the input terminal;

a drive circuit coupled to the transistor arrangement for driving; and an output coupled to the drive circuit, for receiving the output voltage, wherein an AC bridge rectifier is not required for the boost doubler circuit.

2. The circuit of claim 1 further comprising a boost inductor coupled to the transistor arrangement.

3. The circuit of claim 2 wherein the drive circuit comprises at least one transformer.

4. The circuit of claim 3 wherein the transistor arrangement comprises a first transistor and a second transistor.

5. The circuit of claim 4 further comprising first and second capacitors coupled to the output.

6. The circuit of claim 5 wherein the output voltage is 400V.

7. A boost doubler circuit comprising:

an input terminal;

a voltage on the input terminal to an output voltage;

a transistor arrangement coupled to the input terminal;

a boost inductor coupled to the transistor arrangement;

a drive circuit coupled to the transistor arrangement for driving, the drive circuit comprising at least one transformer; and an output coupled to the drive circuit, for receiving the output voltage, wherein an AC bridge rectifier is not required for the boost doubler circuit.

8. The circuit of claim 7 wherein the transistor arrangement comprises a first transistor and a second transistor.

9. The circuit of claim 8 further comprising first and second capacitors coupled to the output.

10. The circuit of claim 9 wherein the output voltage is 400V.

11. A boost doubler circuit comprising:

an input terminal;

a voltage on the input terminal to an output voltage, wherein the output voltage is 400V;

a transistor arrangement coupled to the input terminal, the transistor arrangement comprising a first transistor and a second transistor;

a boost inductor coupled to the transistor arrangement;

a drive circuit coupled to the transistor arrangement for driving, the drive circuit comprising at least one transformer; and an output coupled to the drive circuit, for receiving the output voltage, wherein an AC bridge rectifier is not required for the boost doubler circuit.

* * * * *